July 12, 1932.    G. M. BELLANCA    1,866,961
WING STRUCTURE
Filed July 2, 1931

Inventor
GIUSEPPE M. BELLANCA
By Semmes & Semmes
Attorneys

Patented July 12, 1932

1,866,961

UNITED STATES PATENT OFFICE

GIUSEPPE M. BELLANCA, OF NEWCASTLE, DELAWARE

WING STRUCTURE

Application filed July 2, 1931. Serial No. 548,437.

This invention relates generally to wing structure and more particularly to an improvement in the entering edge of a wing structure.

In the past little or no attention has been given to the joint where the termination of the leading edge of the wing is secured to the wing structure. Heretofore, most attention has been paid to the entering edge of the wing so as to give a positive curvature to the leading edge to insure a definite form to the fabric or cloth covering. The area of greatest reduced pressure on the wing when the airplane is in flight is relatively close to the leading edge of the wing and consequently subjects the fabric covering to alterations of pressure. These changes in pressure tend to slightly move the fabric covering relative to its supporting structure. The forced imposition of the fabric covering upon a relatively sharp edge of the termination of the nose piece presents the danger of fracturing the wing fabric. Manifestly, such fracturing of the fabric covering is to be avoided.

An object of this invention is to provide an airplane wing having an improved type of entering edge structure.

Another object of this invention is to provide an improved wooden airplane wing.

A further object of this invention is to provide an improved airplane wing structure in which the danger of fracturing the fabric covering is minimized.

Yet another object of this invention is to provide an improved wing structure having a fabric covering which is positively formed at the leading edge.

With these and other objects in view, which may be incident to my improvements, the invention consists in the parts and combinations to be hereinafter set forth and claimed, with the understanding that the several necessary elements comprising my invention may be varied in construction, proportions and arrangement, without departing from the spirit and scope of the appended claims.

This invention broadly comprehends the provision of an airplane wing, preferably of wood which is provided at its leading or entering edge with a nose piece of stiff wood or any other relatively stiff inflexible material. The nose piece is of special curvature and is arranged so as to minimize rupture of the wing fabric.

In order to make my invention more clearly understood, I have shown, in the accompanying drawing, means for carrying the same into practical effect without limiting the improvements in their useful applications to the particular constructions which, for the purpose of explanation, have been made the subject of illustration.

Figure 2:
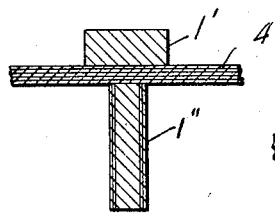
Figure 2 is a view taken along line 2—2 of Figure 1.
Figure 3:
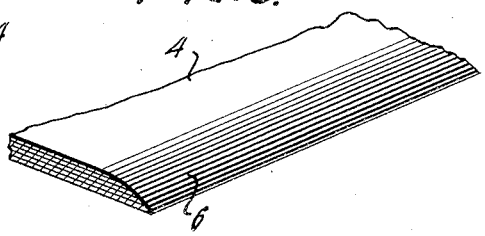
Figure 3 is a perspective view of a portion of the nose piece showing the tapering at the termination thereof.

Referring to the drawing, there is shown an airplane wing comprising wooden ribs 1, which are strengthened and rigidified by wooden trusses 2. As clearly indicated in Figure 2, the ribs of the wing are T-shaped and formed of a top piece 1' and an elongated bottom piece 11'', the purpose of which will hereinafter appear. The wing shown in the drawing is of the full truss diagonal type, but it is to be clearly understood that other forms of wings, such as semi-truss or full truss, diagonal and vertical, may be employed. In addition, diagonal bracing members of a conventional type may be used in accordance with this invention.

A front spar 3 extends longitudinal of the wing for its entire distance. The wing is provided with front and rear spars and their associated ribs, but only the front spar has been shown in the drawing. Any wood of light weight and high strength may be used for the ribs and spar.

Figure 1:
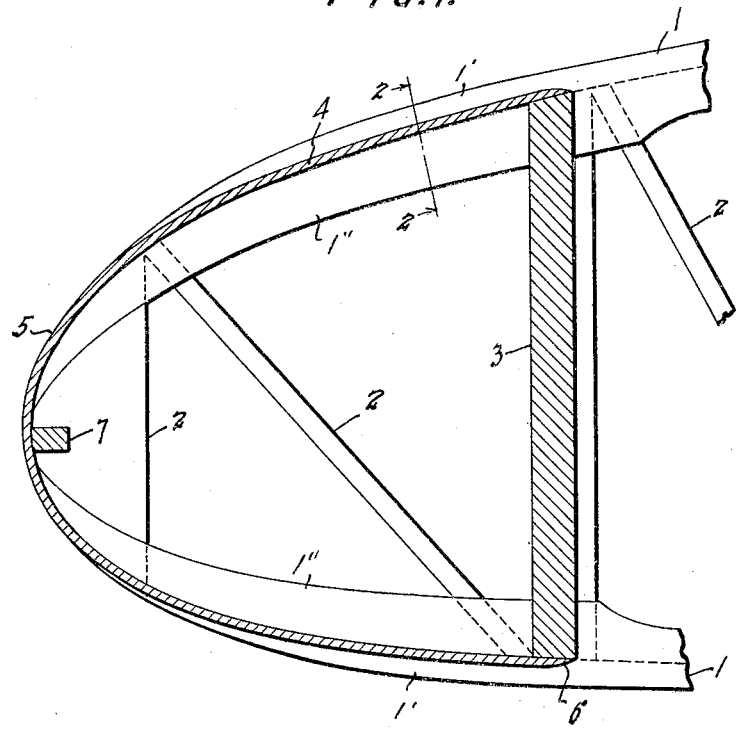
Figure 1 is a side elevational view of a wing and its associated nose piece.

A nose piece 4 is associated with the entering edge of the wing. The nose piece is preferably of ply-wood, but any light-weight metal or metal alloy of high tensile strength may be employed. As shown in Figure 1, the nose piece 4 abuts the curved forward ends of the elongated bottom pieces 1'' of the ribs. The top pieces 1' are also curved and the forward portions thereof are gradually brought to a sharp point, as at 5, to avoid any abrupt change of contour. With this arrangement, a very smooth and continuous surface is maintained and the fabric may be applied without any uneven points in its surface.

The nose piece 4 extends rearwardly of the leading or entering edge for a substantial distance on the upper and lower surfaces of the wing. As clearly illustrated in Figure 1, the nose piece is below the surface of the wing, as defined by the tops of the ribs, from the sharp point 5 at the forward portion thereof to the termination of the nose piece. At the leading surface of the wing, the nose piece is a substantially continuous surface. At the point 5, where the top pieces of the ribs begin, the same smooth continuous surface is maintained in the wing structure.

The rearwardly extending nose piece 4 is tapered, as at 6, in order to avoid a sharp edge at the termination thereof. The tapered ends are suitably secured to the spar 3 which maintains the nose piece in position. It will be evident that by providing a tapering termination of the ends of the nose piece, the possibility of the fabric coming in contact with a sharp edge, thereby rupturing it, is eliminated. The nose piece 4 may be glued or otherwise secured between the top piece 1' and the elongated bottom piece 1'' of the ribs.

There is also provided a longitudinal support member or auxiliary spar 7 extending the length of the wing and suitably secured to the inside of the nose piece at the front thereof. The support member 7 provides means for maintaining the curvature of the nose piece and also tends to maintain the front of the nose piece in position.

From the foregoing, it is apparent that I have provided a wooden wing structure that avoids the possibility of tearing the fabric covering. The nose piece forms a rigid entering edge of the wing and when the fabric covering is applied in the usual manner, a definite form is given to the fabric at the entering edge. No abrupt change in contour of the entering edge of the wing is apparent from the point where the nose piece is below the top portion of the ribs as the top portion follows the same general curvature as the nose piece. A smooth and continuous surface is provided and when the fabric covering flexes due to variations in pressure thereon, the fabric will not encounter a sharp edge of a subjacent surface. This is due to the tapering arrangement at the termination of the sides of the nose piece which prevents rupturing of the fabric when coming in contact therewith. There is provided by this invention a nose piece which gives the desired curvature to the fabric covering and also avoids rupturing of the fabric covering in that it always abuts a substantially flat surface.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:

1. A wing structure comprising a spar and associated ribs, each rib at at least the forward portion thereof comprising a flange section and an associated web; a nose piece defining the entering edge of the wing and extending rearwardly and being confined between the web and flange of the rib and being attached at its termini to the spar.

2. A wing structure comprising leading and trailing spars, a plurality of ribs attached to the spars, the portion of each rib positioned forwardly of the leading spar comprising a web and an associated flange; a nose piece mounted on the rib between the said web and flange, the ends of the nose piece being secured to the spar.

3. A wing structure comprising leading and trailing spars, a rib attached to the spars; the rib comprising a flange and a web; the flange portion of the rib being gradually tapered and terminating rearwardly of the leading edge of the wing; a nose piece attached to the spar and defining the entering edge of the wing and extending between the web and the flange of said rib.

4. A wing structure comprising leading and trailing spars, a rib attached to the spars, and comprising a top flange and a web, a nose piece confined between the flange and web of the rib except at the entering edge of the wing at which entering edge the nose piece defines the contour of the wing and rearwardly of which entering edge the flange portion of the rib defines the contour of the wing.

5. A wing comprising a leading spar and a rib attached to the spar; the rib comprising a web which extends to the leading edge of the wing and a flange which terminates short of the said leading edge and which at such termination is gradually tapered; a nose piece mounted on the web and between the web and rib such that wing contour is defined by the nose piece from the entering edge to the said point of termination but is thereafter defined by the said rib flange.

6. A wing structure comprising a spar and associated ribs, each rib, at least at the forward portion of the wing, comprising a flange section and an associated web, a nose piece defining the entering edge of the wing and extending rearwardly therefrom and being confined between the web and the rib, the rear end of the nose piece abutting the horizontal surface of the spar.

7. A wing structure comprising a spar and associated ribs, each rib, at least at the forward portion of the wing, comprising a flange section and an associated web, a nose piece defining the entering edge of the wing and extending rearwardly therefrom and being confined between the web and the rib, the rear end of the nose piece abutting the horizontal surface of the spar and at such position being tapered on the surface contiguous to the flange.

In testimony whereof I affix my signature.

GIUSEPPE M. BELLANCA.